W. A. RIDER.
PEDAL TRACTION WHEEL.
APPLICATION FILED APR. 5, 1916.
1,209,620.
Patented Dec. 19, 1916.
2 SHEETS—SHEET 1.
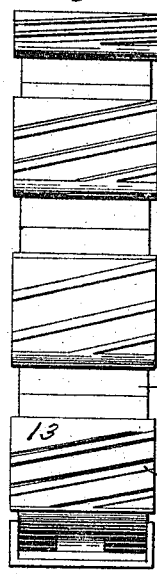
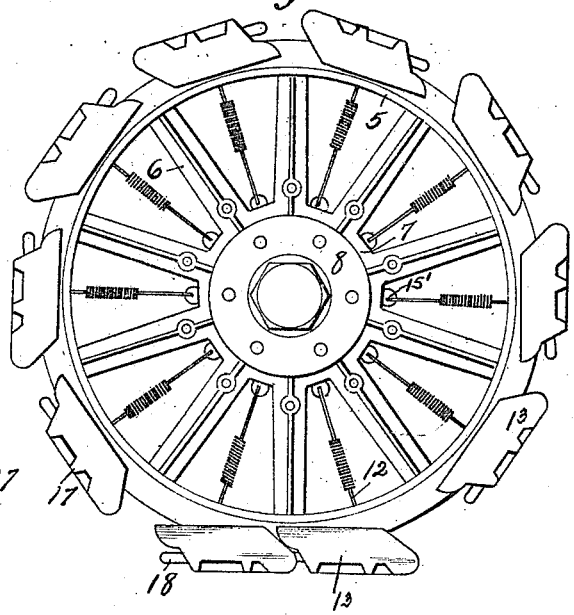
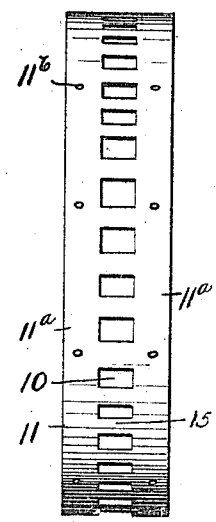
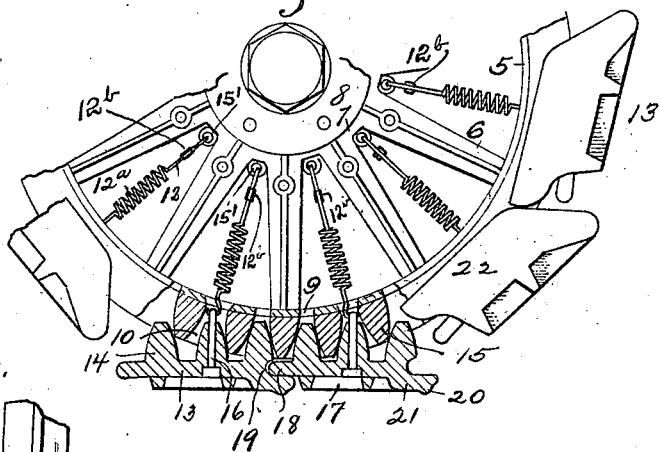
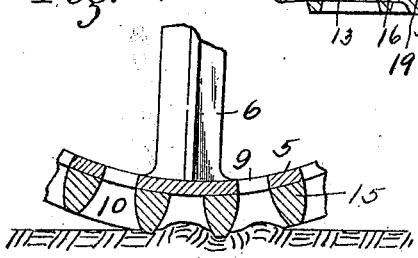
Inventor
William A. Rider.
By William W. Deane.

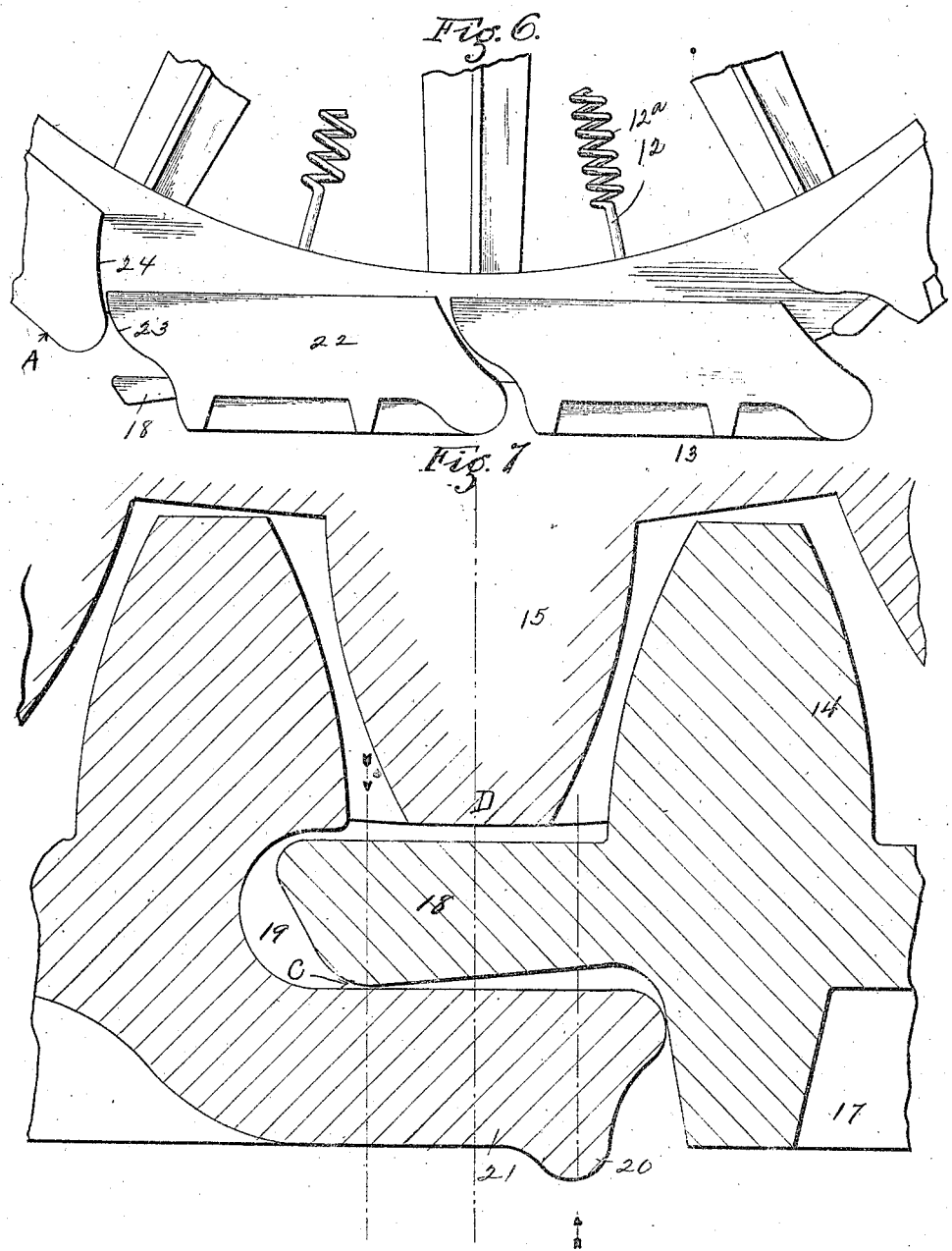

UNITED STATES PATENT OFFICE.

WILLIAM A. RIDER, OF LOS ANGELES, CALIFORNIA.

PEDAL TRACTION-WHEEL.

1,209,620.  Specification of Letters Patent.  Patented Dec. 19, 1916.

Application filed April 5, 1916. Serial No. 89,105.

*To all whom it may concern:*

Be it known that I, WILLIAM A. RIDER, a citizen of the United States, residing at Los Angeles, in the county of Los Angeles and State of California, have invented certain new and useful Improvements in Pedal Traction-Wheels, of which the following is a specification.

This invention relates to pedal wheels and has for its object the provision of an improved device of this character so constructed as to give the traction effect of a caterpillar drive without the employment of the cumbersome parts usually used to that end.

A further object of the invention is to provide a wheel which will give a maximum of traction effect with a minimum of parts and expense.

Further objects and advantages of the invention will be set forth in the following detailed description.

In the accompanying drawings: Figure 1 is an edge view of a wheel constructed in accordance with the invention. Fig. 2 is a side view thereof. Fig. 3 is an edge view of a pocket ring hereinafter described. Fig. 4 is a detail sectional view illustrating the action of the wheel when the pedals are omitted and on soft ground which is comparatively solid. Fig. 5 is a view partly in side elevation and partly in section, of the wheel having the pedals applied thereto. Fig. 6 is a side elevation of the lower portion of a wheel upon an enlarged scale; and Fig. 7 is a detail sectional view upon a greatly enlarged scale illustrating the manner in which adjacent pedals are brought into horizontal alinement with each other.

Like numerals designate corresponding parts in all the figures of the drawings.

In carrying out the invention I provide a wheel comprising a felly 5, spokes 6, and a hub portion 7, of such size as to bolt between the flanges 8, of a standard bearing. The felly 5, has a series of openings 9, formed therethrough, which openings are alined with pockets 10, formed in a ring 11. (See Fig. 3.) By referring to Fig. 3 it will be seen that the ring 11, comprises plain tread portions 11$^a$, between which the pockets 10, are formed. The walls of the pockets are so shaped that the metal between them constitutes, in effect, gear teeth, as is clearly illustrated in Figs. 4, 5 and 7.

Held in coöperative relation to the face of the wheel, by tension device 12, are pedals 13. These pedals are provided with teeth 14, upon their inner faces, adapted to mesh with teeth 15, formed between the pockets 10. The tensioning devices 12, comprise spring elements 12$^a$, and terminal extensions which are connected respectively to eyelets 15′ and to pins 16, the latter passing through the pedals. The outer surfaces of the pedals are provided with cleats 17, though it is to be understood that the faces of these pedals may be covered with any desired material according to the character of the road to be traveled; for instance, I contemplate covering the outer faces of these pedals with wood, rubber or any other suitable material. Each of the pedals 13, is provided with a tongue 18, which is adapted to take into a socket 19, formed in the end of the adjacent pedal. This action is best illustrated in Fig. 7, where it will be seen that a transverse rib 20, is formed upon the portion 21, of the pedal which lies below the tongue 18, of the interengaging pedal. The purpose of arranging the parts as thus shown and described, is to cause those pedals which lie at the bottom of the wheel to horizontally aline themselves with each other so that the wheel may roll from one to the other of these pedals without shock or jar. If such an arrangement as this were not provided the wheel would progress in a series of bumps, but, by virtue of this construction, the wheel is supported for forward movement with no more shock or jar than would be present in a caterpillar construction of the conventional type. Furthermore, it is to be noted that the teeth 14, mesh with the teeth 15, in such manner that the wheel is positively geared to the pedals and consequently slipping of the wheel, with relation to the pedals, is positively guarded against.

It will be seen that the ring shown in Fig. 3, may be slipped from the felly 5, to permit a rubber tire to be placed on said felly if desired. With the ring 3, in position upon the felly the wheel may be used as illustrated in Fig. 4; where the ground is sufficiently hard to permit of this being done. The ring may be secured to the felly by fastening devices, not shown, which are adapted to pass through openings 11$^b$. When the wheel is being used as illustrated in Fig. 4 or when it is being used as illustrated in Fig. 5, the openings 9, formed in the felly of the wheel permit the ready freeing of the pockets or any mud, dirt or the like which may collect therein.

The pedals 13, are further provided with shrouds 22, said shrouds at one end having a convex face 23, disposed toward a concave face 24, of the shroud of the adjacent pedal, by virtue of which construction the pedals are given what is in the nature of an intermeshing engagement so that if one of the pedals comes in contact with a rock or other obstruction, at the point marked A, there will be no possibility of this pedal being pushed past the adjacent pedal on the right in Fig. 6. If this were not provided for it might be possible to push one pedal past the other so that when they came to the bottom of the wheel, their tongues 18, and recesses 19, would not articulate as shown in Fig. 2.

It is to be noted that the point C of the right hand pedal in Fig. 7, comes in contact with the left hand pedal in said figure to the left of the tangent point of the wheel at D, while the left hand pedal comes in contact with the ground at rib 20, whereby these pedals are caused, as hereinbefore set forth, to assume a position of horizontal alinement with relation to each other.

If desired the tensioning device 12, may be provided with adjusting nuts 12$^b$, (see Fig. 5), by which their tension may be increased, as before described, to prevent the pedals from being thrown out of contact with the surface of the wheel by centrifugal force; this is in order to prevent the noise which otherwise would result.

The pedals may engage with pockets formed in a ring, such as ring 11, or they may engage with pockets formed directly in a thickened felly, as in Fig. 6.

If desired suitable cushion elements may be placed between the felly and the ring 11, to deaden sound.

I am aware of the fact that it has heretofore been proposed to mount pedals upon the peripheries of wheels. Some of the devices heretofore used for this purpose are not suitable for traction devices though they are of use upon trailers; in other words, they are of use in preventing the wheel from sinking into the mud but are of little use to secure a tractive effect. When applied to a driving wheel, it is apparent that the wheel shown in the accompanying drawings is well adapted to serve the latter purpose because the pedals are held against slipping with relation thereto and those pedals which contact with the ground are held in such alinement as to provide an unbroken trackway for the wheel.

While the exemplification of the invention illustrated in the accompanying drawings discloses a structure adapted to secure the desired result, I am aware that in the wide field of mechanics many other ways may readily be resorted to to accomplish the end sought and it is to be understood that the invention is not limited to the particular form of apparatus shown, but that it includes within its purview whatever changes fairly come within the spirit of the appended claims.

Having described my invention, what I claim is:—

1. A device of the character described, comprising a wheel, a plurality of pedals secured to said wheel and means for causing adjacent pedals to assume a position of alinement with each other as they move into engagement with the ground and interengaging shrouds carried by said pedals.

2. A device of the character described comprising a wheel having a toothed periphery and a plurality of toothed pedals engaging said wheel, yieldable means normally tending to draw said pedals toward said wheel and interengaging means between the ends of contiguous pedals for moving said pedals into alinement with each other as they come in contact with the ground.

3. A device of the character described comprising a wheel having a toothed periphery and a plurality of toothed pedals engaging said wheel, yieldable means normally tending to draw said pedals toward said wheel and means for adjusting the tension of said yieldable means and interengaging means between the ends of contiguous pedals for moving said pedals into alinement with each other as they come in contact with the ground.

4. A device of the character described comprising a wheel having a plurality of pockets formed in its periphery, which pockets open through the felly of said wheel, in combination with a plurality of pedals having teeth which intermesh with said pockets.

5. A device of the character described comprising a wheel having a plurality of pockets formed in its periphery, which pockets open through the felly of said wheel, in combination with a plurality of pedals having teeth which intermesh with said pockets and interengaging means between the ends of said pedals arranged to bring adjacent pedals in horizontal alinement with each other.

6. A device of the character described comprising a wheel having a plurality of pockets formed in its periphery, which pockets open through the felly of said wheel, in combination with a plurality of pedals having teeth which intermesh with said pockets and interengaging means between the ends of said pedals arranged to bring adjacent pedals in horizontal alinement with each other and spring means normally tending to draw said pedals toward said wheel.

7. A device of the character described comprising a wheel having a plurality of pockets formed in its periphery, which pockets open through the felly of said wheel in combination with a plurality of pedals having teeth which intermesh with said pockets and interengaging means between the ends of said pedals arranged to bring adjacent pedals in horizontal alinement with each other and shrouds carried by said pedals, the adjacent ends of which are constructed to have interengagement with each other.

8. The combination with a wheel, of a plurality of pedals arranged thereupon, each of said pedals comprising a tongue extension at one end and a recess at its opposite end, those ends of the pedals having the recess formed therein carrying extensions which underlie said tongues and transverse ribs carried by said extensions.

In testimony whereof I affix my signature in presence of two witnesses.

WILLIAM A. RIDER.

Witnesses:
M. S. BULKLEY,
R. C. HOADLEY.